Figure 5:
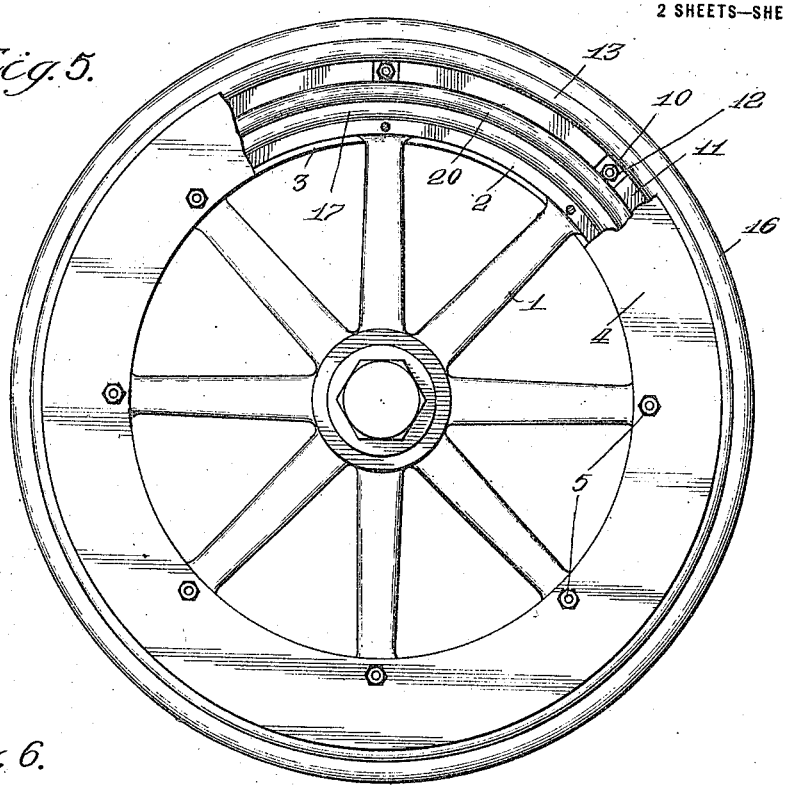
Figure 6:
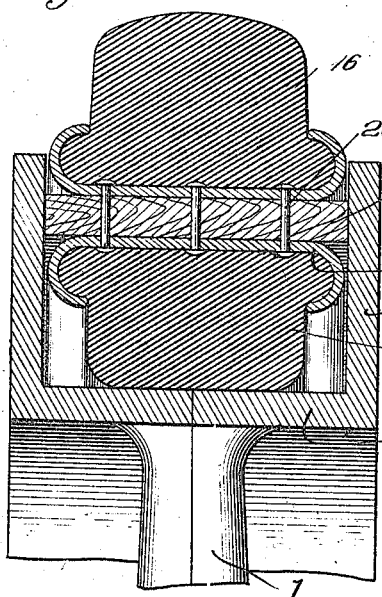
Figure 7:
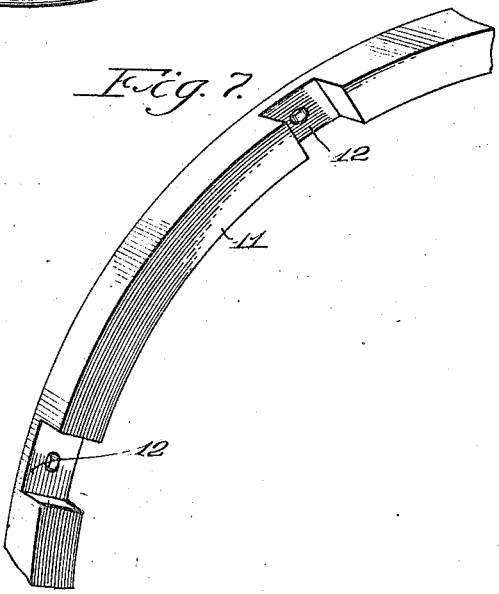

F. A. FROMMANN.
VEHICLE WHEEL.
APPLICATION FILED MAR. 24, 1913.
1,233,462.
Patented July 17, 1917.
2 SHEETS—SHEET 1.
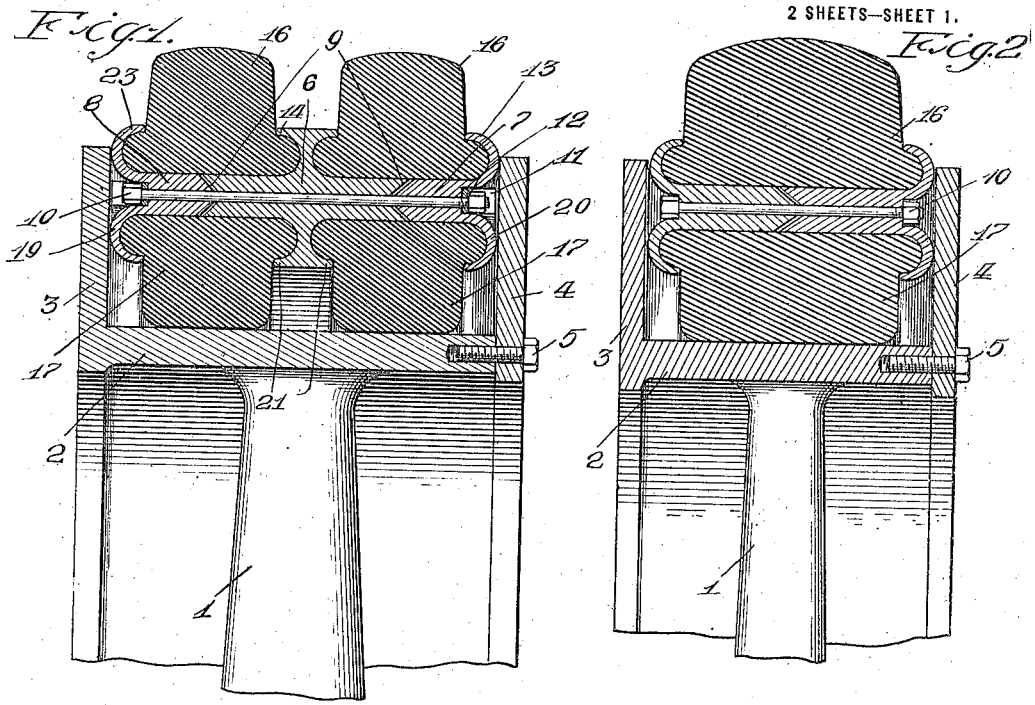
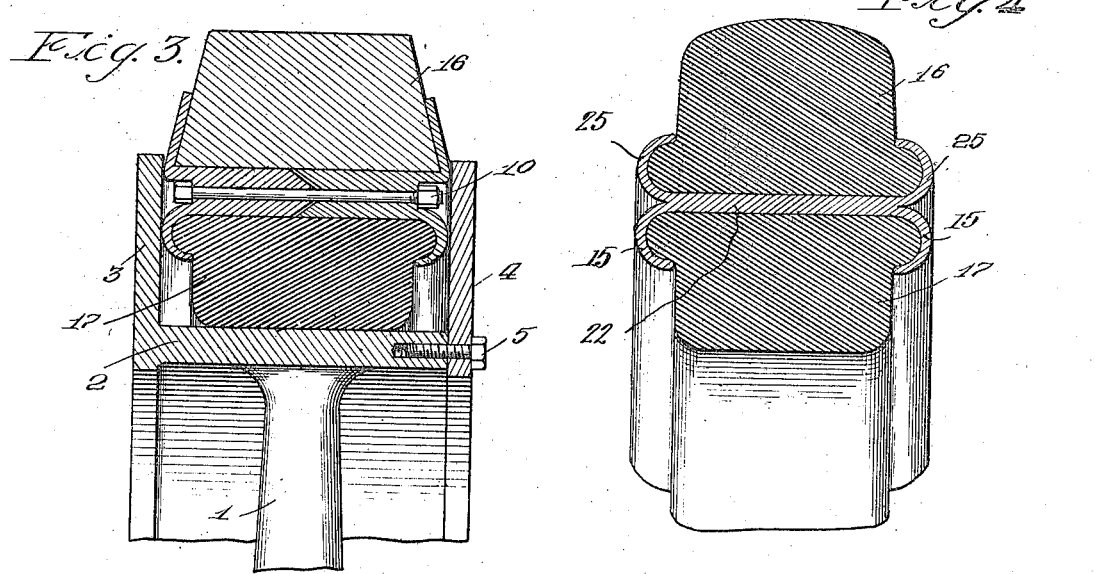
Witnesses:
Inventor
Franklin A. Frommann.
By Lotz + Scheibli
Attys.

F. A. FROMMANN.
VEHICLE WHEEL.
APPLICATION FILED MAR. 24, 1913.

1,233,462.

Patented July 17, 1917.
2 SHEETS—SHEET 2.

Witnesses:
R. L. Farrington
Gladys Neville.

Inventor
Franklin A. Frommann.
By Lotz & Scheibh
Attys.

UNITED STATES PATENT OFFICE.

FRANKLIN A. FROMMANN, OF CHICAGO, ILLINOIS, ASSIGNOR TO OLIVE FROMMANN.

VEHICLE-WHEEL.

1,233,462.   Specification of Letters Patent.   Patented July 17, 1917.

Application filed March 24, 1913. Serial No. 756,436.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle wheels, and has for its objects to provide a wheel equipped with a floating tire which is rotatable upon the felly and is also yieldingly movable relatively thereto radially thereof, and to provide means for preventing noise during the relative movements of the tire and felly in travel.

In the accompanying drawings illustrating a suitable embodiment of my invention:

Figure —1— is a fragmentary radial section of a wheel embodying my invention.

Fig. —2— is a view similar to Fig. —1— illustrating the structure as adapted to a smaller number of cushions.

Fig. —3— is a view similar to Fig. —2—, showing the structure adapted for a wood tread.

Fig. —4— is a modified and simplified form of the tire shown in Fig. —2—.

Fig. —5— is a side view of a wheel equipped with the tire shown in Fig. —1—.

Fig. —6— is a fragmentary radial section of the wheel equipped with a modified arrangement of the tire and the non-metallic or anti-noise member carried thereby.

Fig. —7— is a fragmentary enlarged view in respective of one of the non-metallic rings used in the construction of Figs. —1— and —5—.

My invention consists essentially in providing a floating tire for vehicle wheels which presents a cushion to the felly and a suitable removable tread to the road to take the wear. The invention may be variously embodied, several examples being shown in the accompanying drawings.

The tire may be mounted upon the felly 2 of any suitable wheel-body 1, it being essential that the felly 2 shall be provided with annular side-flanges 3 and 4 which shall be separable to receive the floating tire therebetween. One of said flanges may be secured to one side of the felly by means of the screws 5, though any means for effecting separation of said flanges, including the split wheel body and felly shown in Fig. —6— may be used.

The tire comprises a ring which is of greater diameter than the felly 2 and of less diameter than the flanges 3 and 4. This ring may comprise only one or several members depending upon the number of cushioning rings and treads adapted to be carried thereby. Thus, in Fig. —1—, the ring comprises a middle portion 6 and side portions 7 and 8 separable from the portion 6 in the direction of the axis of the ring. The meeting edges of said several portions are preferably provided with suitable interfitting formations 9 such as annular V-shaped grooves in the side edges of the part 6 receiving the V-shaped edges of the parts 7 and 8. These several parts are bolted together by means of the bolts 10 extending through all of the same parallel with the ring-axis. The said bolts 10 also pass through rings 11 (shown in Fig. —7—) which are non-metallic and serve to space the portions 7 and 8 from the side flanges 3 and 4 and prevent or reduce the noise incident to metal rubbing on metal. Said ring may be made of wood or any other material adapted to the purpose, and is provided at regular intervals with side-recesses 12 in which the heads and nuts of the bolts 10 are adapted to be received.

The parts 7 and 8 of the ring are provided at their outer side-edges, opposing the flanges 3 and 4, with inwardly and outwardly extending annular flanges 13 and 20, and 19 and 23, respectively, which are channeled and have their channeled faces opposing the similar channeled faces of the inwardly and outwardly extending annular ribs 14 and 21 of the part 6 of said ring. Said ribs 14 and 21 are disposed midway between the side edges of said part 6.

The channels of said flanges and ribs are adapted to receive the base-flanges of annular cushions 17 interposed between the said ring and the felly 2 of the wheel-body, and the similar base-flanges of the annular tread-members 16 which project outwardly of the side flanges 3 and 4. Said parts 16 and 17 consist preferably of rubber though, as shown in Fig. —3—, the tread-members 16 may consist of wood and the flanges between which they are held may be simply convergent toward their outer edges instead of presenting opposed channeled faces.

The ring of the tire may also, as shown in Fig. —2—, consist of only two instead of three separable parts for retaining one each of the parts 16 and 17 engaged therewith.

The ring may similarly consist of a single piece of metal as shown in Fig. —4— comprising a web 22 having two outwardly and two inwardly extending annular side-flanges 25 and 15, respectively, the members 16 and 17 being sprung into engagement with said flanges in any well-known manner.

Or, as shown in Fig. —6— the ring may comprise a member 27 of wood to which opposed channeled rings 28 are secured by means of rivets 26; the width of the ring 27 being greater than the width of the channels 28 and serving to hold the latter out of contact with the side-flanges of the felly.

In use, the ring will obviously be crowded to approach the felly radially of the latter and against the action of the cushion 17 radially opposite the point in the tread member 16 bearing the load. The compression of the cushion 17 will not be local as in the tread member, but will be greatest opposite the point on which the load bears, and will be distributed through a crescent extending through a relatively long arc. This will cause a frictional or tractive engagement of the cushion with the felly such as will tend to entirely prevent relative rotation of said parts except to the extent of the well-known "crawl" to which solid rubber tires of vehicle wheels have always been subject.

The unequal pressures on the active portion of the ring carrying the parts 16 and 17 will tend to distort the same locally to increase its diameter and thus to increase the tractive area of tread surface.

I claim as my invention:

1. A wheel having a felly provided with annular side flanges, a floating tire disposed between said flanges and including a ring having non-metallic side edge portions slidably engaging said flanges for holding said tire against lateral movement relatively to the felly.

2. A wheel having a felly provided with annular side flanges, a floating tire disposed between said flanges and including a ring having non-metallic side edge portions slidably engaging said flanges for holding said tire against lateral movement relatively to the felly, annular cushioning means interposed between the ring and felly, and an annular tread member carried by the ring.

3. A wheel having a felly provided with annular side flanges, a floating tire disposed between said flanges and including a ring having non-metallic side edge portions slidably engaging said flanges for holding said tire against lateral movement relatively to the felly, annular cushioning means interposed between the ring and felly, and an annular tread member carried by the ring, said cushioning means and tread member removably engaged with said ring for preventing rotation thereof relatively to said ring.

In testimony whereof I have signed my name in presence of two subscribing witnesses.

FRANKLIN A. FROMMANN.

Witnesses:
ALBERT SCHEIBLE,
M. M. BOYLE.

Copies of this patent may be obtained for five cents each, by addressing the "Commissioner of Patents, Washington, D. C."